March 19, 1929.  F. A. DAVIDSON  1,706,215
ADJUSTABLE COUPLING MEANS
Original Filed Jan. 26, 1926  2 Sheets-Sheet 1

Inventor
FredericA.Davidson
By his Attorney
C. P. Goepel

March 19, 1929.  F. A. DAVIDSON  1,706,215
ADJUSTABLE COUPLING MEANS
Original Filed Jan. 26, 1926  2 Sheets-Sheet 2
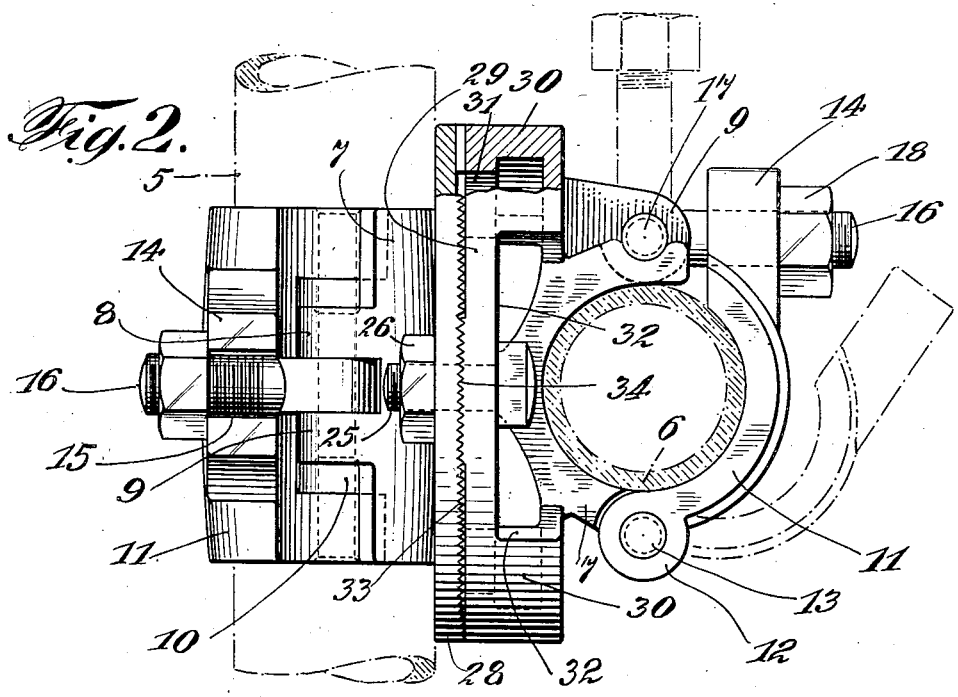
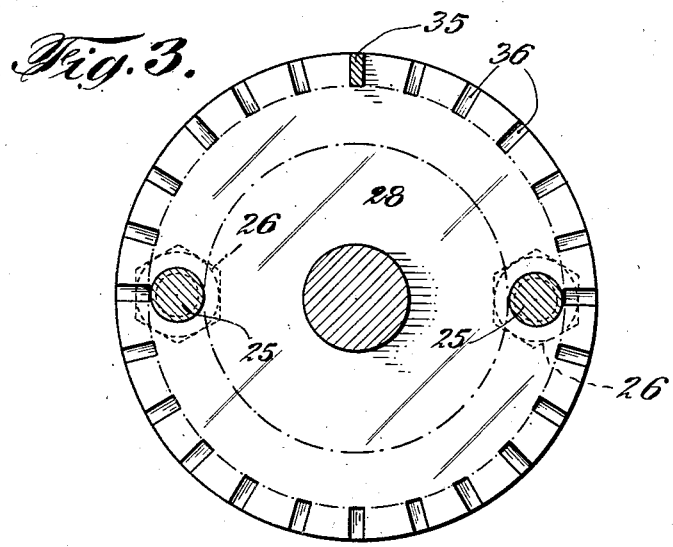
Inventor
Frederic A. Davidson
By his Attorney Patented Mar. 19, 1929.

1,706,215

UNITED STATES PATENT OFFICE.

FREDERIC A. DAVIDSON, OF CHICAGO, ILLINOIS, ASSIGNOR TO AMERICAN SAFETY DEVICE CO., OF NEW YORK, N. Y., A CORPORATION OF NEW YORK.

ADJUSTABLE COUPLING MEANS.

Original application filed January 26, 1926, Serial No. 83,805. Divided and this application filed February 1, 1928. Serial No. 250,968.

The invention herein pertains to coupling devices, and particularly to means for adjustably connecting elements that intersect at varying angles. The invention is especially adapted for use with scaffolds and similar supporting structures of a framework type.

An object of my improvements is to provide a simple coupling device with its principal members permanently but movably united and no loose, or separate parts.

Another object of my invention is to provide a coupling device which can be quickly attached and secured firmly in the position necessary to hold the connecting elements rigidly together.

This invention comprises two clamps for engagement with the elements to be coupled, said clamps having adjacent connected sections to be located between said elements; and a movable section connected to each of the first named sections; together with securing means for the latter sections, so as to tighten the same upon said elements whereby the device is held fast.

I also provide an adjustable connection between the two clamps whereby said clamps can be readily engaged with the respective elements to be coupled, although the planes in which said elements may be positioned may intersect each other at an angle of greater or less than 90°.

Further advantages and features of the improved coupling device, and the form, construction and relative arrangement of its several parts will be hereinafter more fully set forth, illustrated in the accompanying drawings and subsequently incorporated in the subjoined claims.

The drawings show several embodiments of the invention, and the same reference characters designate the same parts throughout the several views,—

Figure 2 is a top view thereof;

Figure 1:
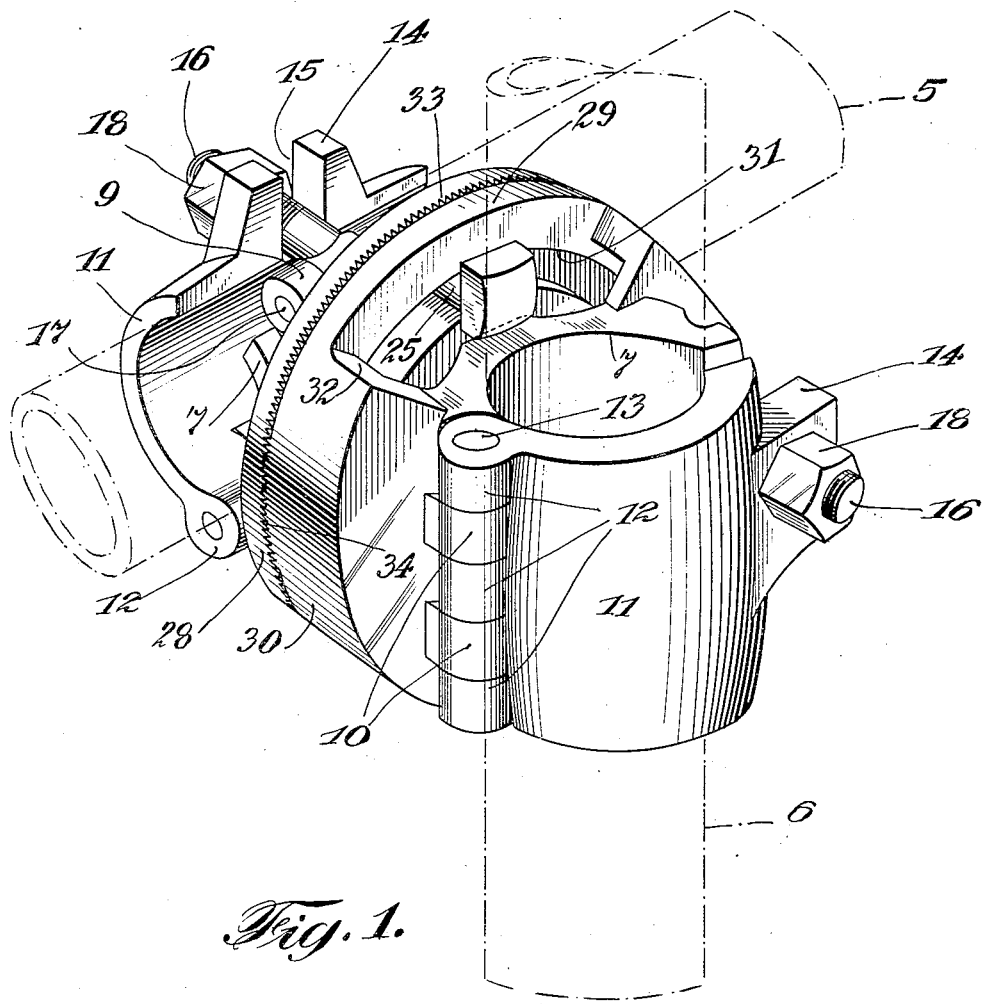
Figure 1 is a perspective view showing one form of my improved coupling device as applied in use.

Figure 3 shows how another form of coupling can have the axes of the two principal parts arranged in different angular relation to each other. This case is a division of my application Ser. No. 83,805, for patent on coupling devices, filed Jan. 26, 1926.

Reference numerals 5 and 6 on Figs. 2 and 3, indicate two supporting elements, which may be tubular or cylindrical, or otherwise shaped, in a scaffold or other structure, and which are to be connected and rigidly held in any desired fixed angular relation.

The coupling device consists of two clamps or coupling sleeves engageable with the supporting elements, each of said clamps including a substantially semi-cylindrical section 7. Each section 7 has spaced apart ears 8 and 9 at one edge and ears or lugs 10 are formed upon the opposite edge of each of the sections 7.

The clamps also include each a movable section 11 complementary in form or shape to the sections 7 and provided upon one of its edges with ears or lugs 12 adapted to be assembled with the spaced ears or lugs 10 on the sections 7. These ears 10 and 12 are apertured to receive the pivot pin 13, whereby the section 11 of each clamp is pivotally connected along one of its edges with the section 7 for swinging movement relative thereto. Upon the opposite longitudinal edge of the pivoted section 11 a laterally projecting lug 14 is formed, said lug being slotted or bifurcated as at 15 for the reception of a bolt 16 having one of its ends positioned between the spaced ears 8 or 9 as the case may be, and loosely engaged for swinging movement upon the pivot pin 17 fixed in said ears. Each of the bolts 16 is threaded to receive a suitable clamping nut 18, which is adapted to engage against the outer side of the lug 14 on the adjacent clamping section 11 to urge the latter and the opposed section 7 of the clamp into tight clamping engagement upon the opposite sides of one of the supporting elements 5 or 6.

It will be apparent that a coupling device of the above description may be very easily and quickly applied and adjusted so as to rigidly connect or couple the members 5 and 6 positioned at an angle to each other, and positively hold the same against relative movement. Thus, it is only necessary, when the two elements 5 and 6 are set, to engage the sections 7 of the two clamps which are open, with the opposed sides of said elements at the point of intersection. The pivoted clamp sections 11 are then swung to closed position against the opposite sides of said elements, the bolts 16 swung inwardly into the slots 15 in the lugs 14 and the nuts 18 finally adjusted by means of a suitable wrench so as to cause the two sections of each clamp to exert the desired tight frictional binding pressure upon the supporting elements. It will be noted that when the device is applied, all of the parts thereof are in assembled relation, and it is not necessary to carry a large number of separate parts to be successively assembled as the device is applied. Therefore, the necessary adjustments may be very easily and quickly made, and the time consumed in the operation of securely and effectively coupling the two supporting elements 5 and 6 with each other is thereby reduced to a minimum. One of the coupling sleeves has a plate 28 integrally formed on one side of one section 7 thereof. A similar plate 29 of the same diameter is spaced from one side of the section 7 of the other coupling sleeve and at diametrically opposite points is integrally connected therewith at its outer edge by the arcuate angular flanges 30. This plate 29 is provided with a continuous circular slot 31, said plate within this slot being directly formed upon and integral with the body of the section 7 of the coupling sleeve. Bolts 25 are engaged through openings in the plate 28 and extend through the slot 31. The spaces indicated at 32 between the parts 30 afford access to the bolt heads which are engaged upon the inner face of the plate 29 at opposite sides of the slot 31 as indicated in Fig. 1 of the drawings. The nuts 26 are threaded upon the other ends of said bolts.

In order to positively prevent relative turning movement of the two parts of the coupling after they have been adjusted, the face of the plate 28 is provided at its outer edge with a continuous annular series of teeth or serrations 33 while the opposed face of the outer edge portion of the plate 29 is provided at diametrically opposite points with a series of similar teeth or serrations 34 to interlock with the teeth 33 when the nuts 26 are tightened on the bolts 25. It will be apparent that by reason of this interlocking connection, the bolts 25 are relieved of strains which might occur from the tendency of the two parts of the coupling to rotate under pressure in relatively opposite directions.

These plates 28 and 29 provide bearing parts for the two clamps or sleeves and admit angular adjustment of the sleeves relative to each other, and the teeth 33 and 34 provide the interlocking portions of the bearing parts. The bolts 25 provide means for rigidly securing the sleeves from displacement when adjusted and retain the bearing parts in interlocked engagement with each other.

In Fig. 1 I have shown a slight modification of this interlocking means for the coupling parts, wherein the plate 29 may be provided at its outer edge with one or more short radially extending key lugs 35 to engage in selected recesses or grooves 36 arranged in suitably spaced relation and in any desired number upon the opposed face of the plate 28. In this case, however, it will be seen that the number of possible adjustments of the two coupling parts will be limited by the number of the key receiving grooves or recesses 36.

From the foregoing description taken in connection with the accompanying drawings, it is believed that the form, construction and several advantages of the device will be clear. In each case, it will be appreciated that the device will have maximum strength and durability while at the same time, it is of comparatively light weight and can be easily handled and quickly applied to securely couple the two elements together. I have referred to certain constructions, which I believe to be thoroughly practical, but it will nevertheless be understood that the device may be susceptible to embodiment in various other alternative structures and I accordingly reserve the privilege of resorting to all such legitimate changes in the form, construction and relative arrangement of the various elements as may be fairly incorporated within the spirit and scope of the invention as claimed.

I claim:

1. A device for coupling elements, comprising two clamps each consisting of an elongated sleeve having relatively movable sections to embrace one of said elements, bolts pivotally connected with one edge of each section intermediate its ends, the other section of each sleeve being provided with a bifurcated lug to receive one of said bolts, nuts threaded upon said bolts to cooperate with said lugs and urge the latter sections into clamping engagement upon the respective elements, a plate rigidly secured to a section of each clamp, and means for adjustably securing said plates together.

2. A device for coupling elements, comprising two clamps each consisting of an elongated sleeve having relatively movable sections to embrace one of said elements, plates on adjacent sections of said sleeves, bolts pivotally connected with one edge of each section intermediate its ends, the other section of each sleeve being provided with a bifurcated lug to receive one of said bolts, nuts threaded upon said bolts to cooperate with said lugs and urge the latter sections into clamping engagement upon the respective elements, one of said plates having a slot therein, and arcuate flanges on opposite edges, and bolts passing through said plate between the flanges to secure the other plate thereto, but permitting adjustment of said plates to vary the relative positions of the clamps.

3. A device for coupling elements, comprising two clamps each consisting of an elongated sleeve having relatively movable sections to embrace one of said elements, plates on adjacent sections of said sleeves, bolts pivotally connected with one edge of each section intermediate its ends, the other section of each sleeve being provided with a bifurcated lug to receive one of said bolts, nuts threaded upon said bolts to cooperate with said lugs and urge the latter sleeve sections into clamping engagement upon the respective elements, one of said plates having a slot therein, and arcuate flanges on opposite edges, and bolts passing through said plate between its ends to secure the other plate thereto, the plates being adjustable when the bolts are loosened to change the relative position of said clamps, said plates having interengaging teeth to prevent relative movement.

4. A device for coupling elements, comprising two clamps each consisting of an elongated sleeve having relatively movable sections to embrace one of said elements, plates on adjacent sections of said sleeves, bolts pivotally connected with one edge of each section intermediate its ends, the other section of each sleeve being provided with a bifurcated lug to receive one of said bolts, nuts threaded upon said bolts to cooperate with said lugs and urge the latter sleeve sections into clamping engagement upon the respective elements, one of said plates having a slot therein, and arcuate flanges on opposite edges, and bolts passing through said plate between its ends to secure the other plate thereto, the plates being adjustable when the bolts are loosened to change the relative position of said clamps, one of said plates having a projection and the other one or more recesses to receive same.

5. A device for coupling together in crossed angularly adjusted positions two members, comprising two clamps one for each member, each clamp consisting of a sleeve to engage the respective member and means for clamping the sleeve on the member, each sleeve having a bearing part for interlocking contact with the bearing part of the other sleeve to admit the relative angular adjustment and locking of the sleeves, and means disposed for rigidly securing said sleeves against relative displacement and retaining said bearing parts in interlocked engagement with each other.

In testimony that I claim the foregoing as my invention, I have signed my name hereto.

F. A. DAVIDSON.